Patented June 13, 1950

2,511,454

UNITED STATES PATENT OFFICE 2,511,454

NITRATION OF PARAFFINS

Richard B. Bishop, Haddonfield, and William I. Denton and Edwin M. Nygaard, Woodbury, N. J., assignors to Socony-Vacuum Oil Company, Incorporated, a corporation of New York No Drawing. Application May 14, 1946,
Serial No. 669,584

9 Claims. (Cl. 260—644)

This application relates to a novel process for the preparation of nitroparaffins from paraffins. More particularly, this application has to do with a process for preparing secondary nitroparaffins from a paraffin containing from three to five carbon atoms and containing at least two secondary hydrogen atoms.

During the past decade considerable progress has been made in the synthesis of nitroparaffins. In the main, this progress has primarily been made in the production of mononitroparaffins by vapor phase reaction of various alkanes with nitrating agents. Under such conditions, mixtures of mononitroparaffins are obtained from a paraffin; for example, nitromethane, nitroethane, and nitropropanes are obtained from propane and suitable nitrating agents. It is clear, therefore, that the nitration is random rather than selective and, further, that scission of the paraffin chain occurs. In addition, partial oxidation products such as aldehydes, ketones and acids are obtained under such conditions, thereby presenting a separation problem and sacrifice in ultimate yield of nitroparaffin. This work has been reported in the literature in the several publications of H. B. Hass and his associates at Purdue University and Commercial Solvents Corporation. No progress, however, has been reported on the selective nitration of paraffins containing from three to five carbon atoms and containing at least two secondary hydrogen atoms, whereby secondary nitroparaffins having the same chain length as the original paraffins are formed. The present application is directed to a solution of this problem.

The present process involves reaction of paraffins of the group referred to hereinabove with a nitrating agent at a temperature from about 150° C. to about 250° C. and at an elevated pressure, whereby secondary nitroparaffins of the aforesaid type are formed. The paraffins contemplated herein are, as aforesaid, those which contain from three to five carbon atoms and which also contain at least two secondary hydrogen atoms. Paraffins contemplated are, therefore, propane, n-butane, n-pentane and 2-methyl butane. By way of illustration, when propane is subjected to the reaction conditions indicated above, 2-nitropropane and 2,2-dinitropropane are formed; similarly, when n-butane is so treated, 2-nitrobutane and secondary polynitro butanes are formed. Accordingly, contrary to previous nitration investigations, no appreciable reaction occurs between the nitrating agent and primary hydrogen atoms of the foregoing paraffins. For example, no appreciable amount of 1-nitropropane or dinitropropane having a nitro group attached to a primary carbon atom is formed; correspondingly, no appreciable amount of 1-nitrobutane or polynitrobutanes having one or more nitro groups attached to one or more primary carbon atoms is formed.

The nitrating agents used in the present process include nitric acids, particularly 40 to 70 per cent nitric acids; anhydrous nitric acid; oxides of nitrogen higher than NO, such as $NO_2$, $N_2O_3$, $N_2O_4$ and $N_2O_5$. Mixed acids such as nitric acid and sulfuric acid mixtures, which apparently contain nitrosulfuric acid, may also be used; however, such acids are limited to those in which the sulfuric acid is present in minor proportions. Of the foregoing nitrating agents, it is preferred that $NO_2$, $N_2O_4$ or nitric acids be used, and of such acids 40 to 70 per cent nitric acids (specific gravity, 1.25 to 1.42) are particularly preferred.

In carrying out the present process it has been found desirable, although not essential, to use a diluent such as water, nitrogen, $CO_2$, etc. Particularly desirable is water in the proportions of from about 10 to about 80 mol per cent, based upon the sum of the molar quantities of paraffin (such, for example, as propane), nitrating agent and water. Water is a product of the reaction and, therefore, dilution of the nitric acid used is not detrimental in a recycle or continuous process. In this connection, when 100 per cent nitric acid is used, the conversions of paraffin to their corresponding secondary mononitroparaffins and polynitroparaffins, and the yields of the said products, are generally lower than when a more dilute nitric acid is used. The molar proportions of paraffin and of the nitrating agent used may be varied considerably, although it is preferred that an excess of paraffin be used.

One of the most critical factors in the present process is reaction temperature. Reaction between the paraffin reactant, such as propane, and the nitrating agent, such as nitric acid, occurs at about 150° C. The temperatures at which the reaction occurs and the optimum temperature varies slightly with each of the aforesaid hydrocarbons. Increasing amounts of the corresponding secondary mononitroparaffins and secondary polynitroparaffins are obtained with increase of temperature until a maximum is reached in the neighborhood of about 170° C. to about 230° C. As reaction temperatures of 250° C. are approached and exceeded the reaction becomes explosive in nature and, therefore, 250° C. represents about the maximum practical operating temperature.

The effective temperature range, therefore, is from about 150° C. to about 250° C. with the preferred or optimum range from about 170° C. to about 230° C.

Pressure is another essential consideration in the present process. At atmospheric pressure, and the aforesaid temperatures, the paraffins contemplated herein are not converted to their corresponding secondary mononitroparaffins and secondary polynitroparaffins. When pressures in excess of 150 pounds per square inch, or in excess of about 10 atmospheres, are used substantial conversions occur, with increasing conversions being obtained with increasing pressures. It has been found that pressures in excess of about 300 pounds per square inch are particularly desirable, with optimum pressures in the range of about 900 to about 1,200 pounds per square inch. Generally, the rate of increase of conversion is much smaller when pressures above about 1,200 per square inch are used.

Space velocity is another factor to be given consideration in this process and is defined herein as the volume of liquid reactants charged per hour per volume of reaction zone. At relatively low pressures, as of the order of 150 to 600 pounds per square inch, a space velocity of about 1 is optimum and small changes in space velocity have a relatively large effect on the conversion. Above 600 pounds per square inch the space velocity may be increased without substantially decreasing the conversion of the said paraffins to their corresponding secondary mononitroparaffins and secondary polynitroparaffins. In general, however, space velocities in excess of about 0.1 are used, but preference is given to those from about 0.5 to about 2.5.

In carrying out this process, it is preferred that the reaction zone used be comprised of or have an inert internal surface. For example, it has been found that an iron reactor promotes, to some extent, the decomposition of the charge materials, thereby decreasing the production of the desired secondary mononitroparaffins and secondary polynitroparaffins. Stainless steel or high nickel steels have been found to be much more desirable especially from the viewpoint of corrosion resistance, although they exert a small promoting effect upon the decomposition of the charge materials. It has also been found that activated alumina, wood charcoal and various alumina-silica synthetic materials promote the decomposition of the charge materials. In view of this relationship, it is preferred to use reactors lined with inert material, or the aforesaid stainless steel or high nickel steels either empty or packed with inert surface materials such as glass beads, porcelain chips, and the like.

The following examples are provided hereinafter in order to further illustrate the present process. The reactor used consists of a vertical stainless steel seamless tube, ¾ inch inside diameter, 40 inches long, packed with 250 ccs. of glass beads which provide a large contact surface. The reactor tube is immersed in a bath of molten heat transfer salt ($KNO_3$—$NaNO_2$ mixture) for proper temperature control. The nitric acid is displaced by an inert liquid such as a light transformer oil from a stationary charge cylinder by means of a reciprocating pump while the paraffin, such as propane, is displaced by water in a similar manner. The nitric acid and paraffin are mixed and then conducted into a preheater of ¼ inch outside diameter, stainless steel tubing. The aforesaid mixture is pumped through the said preheater into the top of the aforesaid reactor tube. The reaction mixture comes in contact with the inert glass beads under suitable reaction conditions and the reaction product obtained therefrom flows from the bottom of the reactor tube to a suitable condenser. Thereafter, it is drained from the high pressure system. The liquid and gaseous products obtained thereby are then separated; the corresponding secondary mono- and polynitroparaffins may be separated from the liquid product by steam distillation, or by water washing and distilling the organic layer obtained thereby. The remainder of the reaction mixture containing paraffin and nitrating agent may then be recycled, with or without fresh paraffin and/or nitrating agent through the reactor. The secondary mononitroparaffin obtained in the reaction mixture, may also be recycled through a similar reactor with a nitrating agent to form a corresponding secondary polynitroparaffin.

*Example I*

Propane (840 grams; 19.1 mols) and 70 per cent nitric acid (987 grams; equivalent to 10.8 mols of 100 per cent nitric acid) were charged to the system described above. The reaction conditions used were: temperature, 185° C.; pressure, 900 lbs. per square inch (gauge); space velocity, 2.0. Recovered from the reaction product were 128 grams of nitrated product. The latter product was distilled in a 50 plate column with a 20:1 reflux ratio and the following fractions were obtained:

(a) 107–117° C.: 4 grams, of which approximately 2.0 grams are $HNO_3$, 1.5 grams are 2-nitropropane and approximately 0.5 gram is nitroethane, as indicated by an infrared analysis.

(b) 117–126° C.: 91 grams of 2-nitropropane.

(c) 126–150° C.: 3.5 grams of which 1.7 grams are 2-nitropropane and 1.8 grams are 1-nitropropane.

(d) >150° C.: 18 grams of 2,2-dinitropropane.

This represents a conversion of 12.0 per cent of the nitric acid to 2-nitropropane and 2,2-dinitropropane, and only about 0.05 per cent to nitroethane and 0.17 per cent to 1-nitropropane. No nitromethane was found in the reaction product.

*Example II*

Propane (176 grams; 4 mols) and 70 per cent nitric acid (180 grams; equivalent to 2 mols of $HNO_3$) were charged to the system described above. The reaction conditions employed were: temperature, 190° C.; pressure, 900 pounds per square inch (gauge); space velocity, 2.0. Recovered from the reaction product were 16 grams of 2-nitropropane and 1.5 grams of 2,2-dinitropropane. The nitrated products represent a 10.1 per cent yield of theory per pass, based on the nitric acid charge; or a yield, by weight, of 14.5 per cent. Less than 0.20 per cent of 1-nitropropane or other nitro paraffins were formed from the charge materials, as indicated by infrared analysis of distillation fractions of the reaction product.

*Example III*

In this example, 510 grams of propane and 685 grams of 70 per cent nitric acid were charged to the previously described system, with the following reaction conditions being used: temperature, 205° C.; pressure, 900 pounds per square inch (gauge); space velocity, 2.0. The nitrated products obtained were 2-nitropropane, 38 grams, and 2,2-dinitropropane, 11.4 grams; equivalent to an 8.0 per cent conversion of nitric acid to nitrated products.

Example IV

Propane (234 grams; 5.3 mols) and 70 per cent nitric acid (280 grams; equivalent to 3.1 mols of 100 per cent nitric acid) were charged to the system previously described. The reaction conditions maintained were: temperature, 215° C.; pressure, 900 pounds per square inch (gauge); space velocity, 2.0. The reaction product was fractioned, whereupon 21 grams of 2-nitropropane and 3.0 grams of 2,2-dinitropropane were obtained. This represents a theoretical yield, per pass, of 9.2 per cent of nitrated products based on nitric acid charge.

Example V

Butane (370 grams; 6.4 mols) and 70 per cent nitric acid (376 grams; equivalent to 4.1 mols of 100 per cent nitric acid) were charged to a system such as described above. Here, the reactor was again a ¾ inch inside diameter, stainless steel, seamless tube, but no preheater was used. The tube was packed with 230 ccs. of glass beads rather than 250 ccs. The reaction conditions used were: temperature, 205° C.; pressure, 900 pounds per square inch (gauge); space velocity, 1.2. The yield of secondary nitrobutanes, primarily 2-nitrobutane, was 98 grams or 14.5 per cent per pass based upon butane charged; based upon nitric acid charged, the conversion per pass was 23.0 per cent.

Thirty-eight grams of the nitrobutane product was subjected to distillation in a 15–16 plate column, packed with glass helixes, and with a reflux ratio of 5:1. The following fractions were obtained:

(a) 128–131° C.: 5.0 grams of which the predominant material is 2-nitrobutane (boiling point, 139.6° C.); the boiling point here is low due to traces of water and nitric acid, thus confirming the observation of E. B. Hodge (Ind. Eng. Chem. 32, 748 (1940)).

(b) 134–140° C.: 31.0 grams of 2-nitrobutane.

(c) Residue: 2.0 grams of a mixture of 2-nitrobutane, secondary polynitrobutanes and, possibly, a trace of 1-nitrobutane.

The secondary mono- and poly-nitroparaffins obtained in the present process are valuable chemical intermediates. The secondary polynitroparaffins characterized by attachment of two nitro groups to a secondary carbon atom—such as 2,2-dinitropropane—are valuable ignition improving agents for Diesel fuels and may also be used as monofuels for projectiles and underwater craft, as well as for explosives, propellants, etc.

It is to be understood that this invention is not to be limited by the foregoing illustrative material, but is to be broadly construed in the light of the defining language of the appended claims.

This application is a continuation-in-part of our copending application Serial No. 629,001, filed November 15, 1945, now Patent No. 2,489,320 which, in turn, is a continuation-in-part of our copending application Serial No. 613,712, filed on August 30, 1945, now Patent 2,425,367 with Thomas T. Noland.

We claim:

1. A process for the obtainment of high yields of a secondary mononitroparaffin selected from the group consisting of secondary mononitrobutane and secondary mononitropentane which comprises reacting a normal paraffin selected from the group consisting of n-butane and n-pentane with a nitrating agent at a temperature between about 150° C. and about 250° C. at an elevated pressure in excess of about 150 pounds per square inch and with a space velocity in excess of about 0.1.

2. A process for the obtainment of high yields of a secondary mononitroparaffin selected from the group consisting of secondary mononitrobutane and secondary mononitropentane which comprises reacting a normal paraffin selected from the group consisting of n-butane and n-pentane with nitric acid at a temperature between about 150° C. and about 250° C. at an elevated pressure in excess of about 150 pounds per square inch and with a space velocity in excess of about 0.1.

3. A process for the obtainment of high yields of a secondary mononitroparaffin selected from the group consisting of secondary mononitrobutane and secondary mononitropentane which comprises reacting a normal paraffin selected from the group consisting of n-butane and n-pentane with a nitrating agent at a temperature between about 150° C. and about 250° C. at an elevated pressure in excess of about 150 pounds per square inch and with a space velocity in excess of about 0.1 in the presence of a diluent.

4. A process for the obtainment of high yields of a secondary mononitroparaffin selected from the group consisting of secondary mononitrobutane and secondary mononitropentane which comprises reacting a normal paraffin selected from the group consisting of n-butane and n-pentane with nitric acid at a temperature between about 150° C. and about 250° C. at an elevated pressure in excess of about 150 pounds per square inch and with a space velocity in excess of about 0.1, in the presence of from about 10 to about 80 molar per cent of water, based upon the sum of the molar quantities of paraffin, nitrating agent and water.

5. A process for the obtainment of high yields of 2-nitrobutane which comprises reacting n-butane with a nitrating agent at a temperature between about 150° C. and about 250° C. at an elevated pressure in excess of about 150 pounds per square inch and with a space velocity in excess of about 0.1.

6. A process for the obtainment of high yields of 2-nitrobutane which comprises reacting n-butane which nitric acid at a temperature between about 150° C. and about 250° C. at an elevated pressure in excess of about 150 pounds per square inch and with a space velocity in excess of about 0.1.

7. A process for the obtainment of high yields of 2-nitrobutane which comprises reacting n-butane with 70% nitric acid at a temperature between about 150° C. and about 250° C. at an elevated pressure in excess of about 150 pounds per square inch and with a space velocity in excess of about 0.1.

8. A process for the obtainment of high yields of 2-nitrobutane which comprises reacting n-butane with 70% nitric acid at a temperature between about 170° C. and about 230° C. at an elevated pressure in excess of 300 pounds per square inch and with a space velocity of from 0.5 to 2.5.

9. A process for the obtainment of high yields of 2-nitrobutane which comprises reacting n-butane with 70% nitric acid at a temperature between about 170° C. and about 230° C. at an elevated pressure between about 900 pounds per square inch and about 1,200 pounds per square inch and with a space velocity of from about .5 to about 2.5.

RICHARD B. BISHOP.
WILLIAM I. DENTON.
EDWIN M. NYGAARD.

REFERENCES CITED

The following references are of record in the file of this patent:

UNITED STATES PATENTS

| Number | Name | Date |
|---|---|---|
| 1,967,667 | Hass et al. | July 24, 1934 |
| 2,206,813 | Hass et al. | July 2, 1940 |
| 2,382,241 | Levy | Aug. 14, 1940 |
| 2,425,367 | Denton | Aug. 12, 1947 |

OTHER REFERENCES

Hass et al. "Ind. & Eng. Chem.," March 1936, vol. 28, No. 3, pages 340 to 344.

Urbanski et al. "Chemical Abstracts," vol. 31 (1937), page 6190, abstract of "Rocziniki Chem.," vol. 17 (1937), pages 161–164.

Urbanski et al. "Chemical Abstracts," vol. 33, (1939), page 532, abstract of "IIe Cong. Mondial Petrol sec. 2, Phys. Chem. Ruffinage" (1937), pages 163–167.

Urbanski et al. "Comptes Rendus Acad. Sci.," vol. 204 (1937), page 870.